July 10, 1956  G. H. TAYLOR  2,753,624
METHOD OF ASSEMBLING TWO COMPONENTS BY A FASTENER
Filed Jan. 27, 1953

United States Patent Office 2,753,624
Patented July 10, 1956

2,753,624

METHOD OF ASSEMBLING TWO COMPONENTS BY A FASTENER

George Harold Taylor, Preston, England, assignor to The English Electric Company Limited, London, England, a British company Application January 27, 1953, Serial No. 333,498

Claims priority, application Great Britain February 6, 1952

1 Claim. (Cl. 29—522)

The invention relates to rivets having one head completely enclosed within one of the two components riveted together, whereby the surface finish of the said component remains unaffected by the rivet, and any leakage along the rivet is obviated.

Such rivets are particularly suitable for aircraft fuel tanks integral with the wing structure, where a good surface finish is very important for aerodynamic reasons, and where fuel leakage through the rivets has to be avoided. However, these rivets are suitable for any type of pressure vessel or for other purposes where their use has the advantages mentioned hereinabove.

According to the process of the invention, a hole is drilled through one component, and to such a depth only into the other component which in the assembly will be the outer component, that it ends short of the surface thereof as a blind hole. This blind hole is then counterbored to provide it with a flat bottom. A circular groove is then cut around the bottom part of the blind hole, leaving a cylindrical neck of the original bore diameter adjacent the first mentioned component.

A cylindrical headless rivet is then inserted through the bore of the said first component right to the bottom of the blind hole in the said second component, a shroud having a cylindrical bore of the same diameter as the said hole is applied over the protruding end of the said rivet and to the free face of said first component, and a "hold up" tool to the free face of said second component.

Provision is made for venting the annular chamber surrounding the innermost part of the cylindrical rivet. Then a punch, guided in the bore of the shroud, is applied to the outer end of the cylindrical rivet, and pressure is applied whereby the inner end thereof plastically flows into the circular groove, completely filling the said annuar chamber. Eventually the shroud is removed, and a second, larger punch is applied to deform the outer end of the rivet into a rivet head on that side of the joint where such a head does not cause any inconvenience i. e. for example at the inside of a fuel tank or the like.

In order that the invention may be better understood, some embodiments thereof will now be described by way of example, with reference to the accompanying drawing in which.

Figure 8:
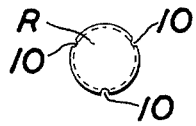

Fig. 8 the same in end elevation.

Figure 1:
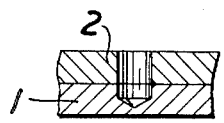
Fig. 1 is a section through two components to be riveted together, in the first phase of the making of the rivet hole.
Figure 2:
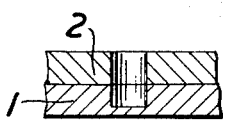
Fig. 2 shows the blind hole counterbored (second phase).
Figure 3:
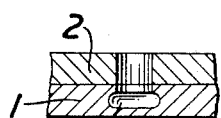
Fig. 3 shows the blind hole undercut with a circular groove (third phase).
Figure 4:
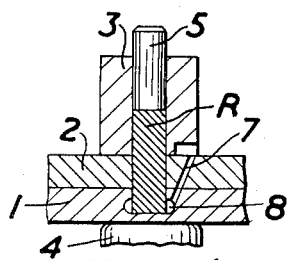
Fig. 4 shows a cylindrical rivet inserted into the blind hole through the hole in the other component, surrounded by a shroud, a "hold up" tool piece applied to the free face of the component containing the blind hole, and a punch inserted into the shroud (fourth phase).
Figure 5:
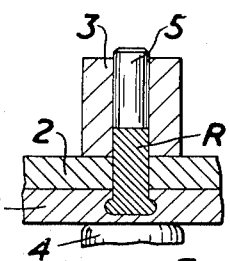
Fig. 5 shows the "first close," when the internal rivet head is formed (fifth phase).
Figure 6:
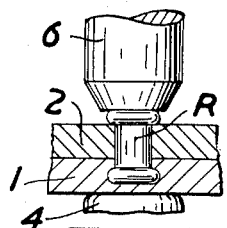
Fig. 6 shows the "second close," i. e. the formation of the external rivet head (sixth phase).

In Figs. 1 to 6 the rivet is denoted R, the skin is denoted 1, the inner component e. g. a boom, is denoted 2, the shroud 3, the "hold up" tool 4, the small punch 5 (of the same diameter as the rivet shank), the large punch 6. In Fig. 4 a vent hole 7 is shown to connect the circular groove 8 to the atmosphere. This vent hole 7 is shown at an angle to the rivet hole; however, it may be arranged parallel to it. This vent hole 7 and a corresponding recess in the shroud 3 are not shown in the other figures.

Figure 7:
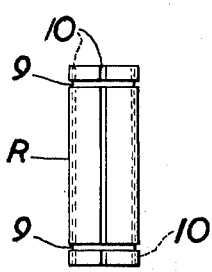
Fig. 7 shows a modified rivet in side elevation.

According to Figs. 7 and 8, two annular grooves 9 are provided at a distance from the ends of the rivet, the groove 9 at the end of the rivet R inserted into the blind hole being thus in communication with the groove 8 in the blind hole. A longitudinal groove or grooves 10, say three of them, are arranged on the circumference of the rivet R. Thereby the circular groove 8 of the blind hole is vented to the atmosphere without requiring a vent hole such as 7 (Fig. 4) in the components to be joined together.

These two components are drawn together by the swelling of the internal rivet stem inside the through hole and by its downward movement in filling the groove 8. It is essential that the edges of the holes in the two components in contact are left sharp lest the rivet might swell between the plates, thus causing them to separate.

What I claim as my invention and desire to secure by Letters Patent is:

A process of assembling together two components by a fastener comprising the following steps in succession: drilling a hole of a diameter fitting the rivet shank through one component and as a blind hole into the other component; counterboring the inner end of the said blind hole providing the same with a flat bottom; cutting a circular groove around the said bottom; inserting a headless cylindrical rivet having longitudinal grooves through the bore of the said first component right to the bottom of the said blind hole; applying axial compression to the free end of the said rivet while guiding the same against lateral expansion and venting the said circular groove through the said longitudinal grooves filling the said circular groove with the expanding inner end of the rivet; and applying axial compression to the free end of the said rivet, allowing the same to expand laterally, forming the external head thereof.

References Cited in the file of this patent

UNITED STATES PATENTS

| | | |
|---|---|---|
| 37,555 | Barnard | Jan. 27, 1863 |
| 262,189 | Trageser | Aug. 1, 1882 |
| 355,274 | Manly | Dec. 28, 1886 |
| 625,491 | Converse | May 23, 1899 |
| 840,524 | Sturdevant | Jan. 8, 1907 |
| 1,339,453 | Grimes et al. | May 11, 1920 |
| 1,367,134 | Hachmann | Feb. 1, 1921 |

(Other references on following page)

UNITED STATES PATENTS

| | | |
|---|---|---|
| 1,578,173 | Retterath | Mar. 23, 1926 |
| 1,934,780 | Van Halteren | Nov. 14, 1933 |
| 1,996,128 | Thomson | Apr. 2, 1935 |
| 2,038,124 | Osborne | Apr. 21, 1936 |
| 2,147,763 | Becker | Feb. 21, 1939 |
| 2,148,883 | Taylor et al. | Feb. 28, 1939 |
| 2,194,458 | Eckler | Mar. 26, 1940 |
| 2,236,804 | Miller | Apr. 1, 1941 |
| 2,317,794 | Neubert | Apr. 27, 1943 |
| 2,328,391 | Nelson | Aug. 31, 1943 |
| 2,338,736 | Peterson et al. | Jan. 11, 1944 |
| 2,352,429 | Gomperz | June 27, 1944 |
| 2,361,668 | Wales | Oct. 31, 1944 |
| 2,364,011 | Wales | Nov. 28, 1944 |

FOREIGN PATENTS

| | | |
|---|---|---|
| 257 | Great Britain | Jan. 26, 1866 |
| 517,726 | Germany | Jan. 22, 1931 |
| 934,615 | France | Jan. 19, 1948 |